US012458987B2

(12) United States Patent
Drechsel

(10) Patent No.: US 12,458,987 B2
(45) Date of Patent: Nov. 4, 2025

(54) LIQUID DIFFUSER DEVICE FOR IRRIGATION SYSTEMS

(71) Applicant: Arno Drechsel, Lienz (AT)

(72) Inventor: Arno Drechsel, Lienz (AT)

(73) Assignee: Komet Austria GmbH, Lienz (AT)

( * ) Notice: Subject to any disclaimer, the term of this patent is extended or adjusted under 35 U.S.C. 154(b) by 379 days.

(21) Appl. No.: 18/217,557

(22) Filed: Jul. 1, 2023

(65) Prior Publication Data

US 2024/0326072 A1 Oct. 3, 2024

(30) Foreign Application Priority Data

Mar. 29, 2023 (IT) ........................ 102023000006126

(51) Int. Cl.
*B05B 3/04* (2006.01)
*B05B 3/00* (2006.01)
*B05B 15/52* (2018.01)

(52) U.S. Cl.
CPC ............ *B05B 3/0426* (2025.08); *B05B 3/008* (2013.01); *B05B 15/52* (2018.02)

(58) Field of Classification Search
CPC ....... B05B 3/0426; B05B 3/008; B05B 15/52; B05B 3/005; B05B 3/0425; B05B 1/26; B05B 15/18; B05B 3/003; B05B 1/16; B05B 15/65; B05B 1/265; B05B 15/658; B05B 1/3402
See application file for complete search history.

(56) References Cited

U.S. PATENT DOCUMENTS

| | | | | |
|---|---|---|---|---|
| 6,267,299 | B1 * | 7/2001 | Meyer | B05B 3/0426 239/524 |
| 6,439,477 | B1 * | 8/2002 | Sweet | B05B 3/008 239/231 |
| 2019/0054481 | A1 * | 2/2019 | Sesser | B05B 3/003 |
| 2024/0238815 | A1 * | 7/2024 | Burcham | B05B 12/18 |

* cited by examiner

*Primary Examiner* — Steven M Cernoch
(74) *Attorney, Agent, or Firm* — Themis Law

(57) ABSTRACT

A liquid diffuser device includes a frame provided with a nozzle for generating a liquid jet; a deflector assembly having a deflector plate with an upper face facing the nozzle and a lower face with a shank extending therefrom; and a containment member associated with the frame and having a peripheral annular collar, a stem, and a rotatable support on a bottom wall of a cavity. The shank of the deflector assembly rests against the rotatable support, the deflector plate being spaced from the annular collar to enable the free rotation of the deflector assembly. A protection member joined to the deflector plate is configured to occlude the space between the lower face of the plate and the annular collar of the containment member and to enclose the containment member, the rotatable support and all moving parts of the deflector assembly, preventing the entry of liquids, solids and debris.

15 Claims, 6 Drawing Sheets

LIQUID DIFFUSER DEVICE FOR IRRIGATION SYSTEMS

FIELD OF THE INVENTION

The present invention is generally applicable to the technical field of the irrigation systems for agriculture, and it particularly relates to a liquid diffuser device for irrigation systems.

BACKGROUND OF THE INVENTION

The use of diffuser devices or sprinklers in fluid communication with a line for supplying a liquid, mainly water, to evenly distribute the liquid over the land to be irrigated has long been known in the field of irrigation systems.

A particular type of diffuser devices consists of nutating sprinklers which have the advantage of lower complexity and smaller number of components with respect to other types of sprinklers and allow feeding with less filtered water such as water from rivers, streams, lakes, ponds, wells and/or other water sources.

Nevertheless, nutating sprinkler components, such as the deflector, can wear due to their orbital motions and they need to be replaced frequently. Using less purified water can also cause debris to build up, resulting in components being repaired or replaced and/or cleaned up at relatively high costs and discontinuous operation.

A typical nutating diffuser device comprises a frame defining a central axis with a connection joint for connecting to a supply line and with a nozzle for dispensing a liquid jet, a deflector assembly with a deflector plate facing the nozzle and adapted to intercept the liquid jet generated by the nozzle and deflect it partly radially to distribute it evenly over an area surrounding the land and to promote the rotation of the assembly.

The frame has an annular wall which defines a rolling surface for the deflector plate, whose stem is mounted on a spherical support to allow the tilting rotation of the deflector assembly around an axis inclined with respect to the central axis of the frame.

Due to the open frame, water, dirt and debris can enter into the rolling surface and spherical support area, preventing free rotation of the stem in the worst conditions.

If water comes from canals in the ground, besides sand and mud, it may also contain vegetation and algae, especially in advanced irrigation season and, under extreme conditions, it may prevent the rolling of the deflector assembly and hinder the operation of the device.

U.S. Pat. No. 10,864,534 discloses an orbital sprinkler of the type indicated above, which comprises a deflector assembly with a deflector plate having an upstream side facing toward the nozzle and a downstream side with a shaft. On the deflector body there is fitted a shoulder for guiding the splined shaft, and the latter is provided with a flange upstream and a flange downstream with respect to the shoulder. These two flanges have a very small diameter and are not able to prevent water from flowing towards the guide shoulder.

U.S. Pat. No. 10,828,653 discloses a sprinkler with a nozzle in fluid communication with the water inlet, a bearing positioned downstream of the nozzle and supported by the frame, and a deflector assembly located between the nozzle and the bearing. The deflector assembly comprises a distribution plate configured to divert water from the nozzle and a stem having the lower end resting against the ball bearing.

The deflector assembly is configured to move with respect to the axis of the nozzle in one or both rotation directions and inclination, and the bearing is a ball configured to substantially withstand the entire axial load generated by the weight of the deflector assembly. No protection against the entry of liquids and solids into the bearing area is provided in this known sprinkler.

The common drawback of these known diffuser devices, therefore, lies in the poor reliability due to the risk of blocking the deflector assembly and, therefore, stopping the device.

This is mainly due to the fact that the water introduced into the supply line of the device is not clean, sometimes it is pumped from groundwaters or comes from aqueducts with no filtration stations and may contain mud particles, impurities and debris.

These particles can easily enter into the moving parts of the device, causing them to stop and preventing the correct operation as well as damaging the diffuser both at start-up and full operation.

Furthermore, the introduction of particles and debris into the device can lead to increased wear on the moving parts, resulting in shorter life and need for more frequent maintenance of the device.

Still, in the event of damage beyond a given level, the device must be replaced, resulting in a higher operating cost of the system.

TECHNICAL PROBLEM

In the light of the state of the art, the technical problem addressed by the present invention is to increase the reliability of the diffuser device and provide optimal operation even in the presence of dirt and debris in the irrigation liquid.

SUMMARY OF THE INVENTION

The object of the present invention is to solve the aforementioned technical problem by providing a liquid diffuser device for irrigation systems which is highly efficient, reliable and relatively cost-effective.

A particular object of the present invention is to provide a liquid diffuser device of the type described above which hinders the entry of dirty liquids and debris into the area of its moving parts or in mutual rolling contact.

A further particular object of the present invention is to provide a diffuser device which ensures a correct operation and triggers the orbital motion of the deflector.

Another object of the present invention is to provide a liquid diffuser device of the type described above which has a relatively simple structure and which is easy to assemble and maintain.

Another object of the present invention is to provide a liquid diffuser device of the type described above which is particularly durable.

These and other objects which will be more apparent hereinafter, are achieved by a liquid diffuser device for flow irrigation systems as described herein.

The device according to the invention comprises a frame having an inlet portion provided with a nozzle connected to a line for supplying a liquid to generate a jet and an outlet portion provided with a stabilizing mass, a deflector assembly having a deflector plate facing said nozzle and a stem downstream of said plate, a containment body connected to said outlet portion and having a cavity with a bottom wall on which there is arranged a rotatable support, wherein said deflector assembly is inserted into said cavity of said containment body with an end of said stem resting against said support to allow a rotation of said assembly with rotary and orbital motion, and wherein, downstream of said deflector plate, there is provided a protection member configured to enclose said containment body, said stem and said rotatable support so as to prevent the entry of dirty liquid and debris and ensure the orbital motion of said deflector assembly.

The combination of these characteristics provides for the free orbital motion of the deflector assembly, even when supplying liquids containing impurities, dirt and debris.

In a preferred embodiment, the deflector plate has a surface facing the nozzle which is adapted to deflect the jet radially outwards to promote the rotation of the deflector assembly and, on the opposite side, a first substantially cylindrical connection flange adapted to be coupled to an enlarged end portion of the stem.

In a preferred embodiment, the containment member is cup-shaped and has a collar with a substantially cylindrical internal surface defining a rolling surface for the first connection flange of the deflector plate and a bottom wall.

In a preferred embodiment, the protection member has a shape similar to that of the containment member which is larger than the latter.

Furthermore, the protection member has an upper peripheral edge which can be fittingly coupled with a second connection flange of the deflector plate which is radially staggered with respect to the former.

This configuration allows the protection member to envelop the entire area of the moving parts, both laterally and from above, so as to effectively prevent the entry of dirty liquids and debris into such area.

In an embodiment, the rotatable support comprises a spherical member housed in a seat of complementary shape formed in the bottom wall of the containment body. Furthermore, the stem is tubular and has, at the vacant end thereof, a housing which is shaped to rest on the spherical member with minimal friction.

This configuration allows the diffuser to ensure a correct operation and trigger the initial orbital motion of the deflector, increasing the reliability of the device as a whole.

In an embodiment, the protection member comprises a substantially frustoconical portion having at the narrow section thereof a radially inwardly directed end edge with a circular opening having an inner diameter larger than the outer diameter of the stem.

This dimensioning allows the protection member not to interfere with the precession movement of the deflector assembly and therefore prevents wear on the moving parts thereof.

Preferably, the containment member has, in proximity of the bottom wall thereof, an axial appendage which can be coupled to the lower portion of the main body through universal connection means, for example threaded connections.

This extremely simple structure of the protection member and of the moving parts provides for an extremely easy and safe assembly and maintenance of the device.

Furthermore, the device is particularly durable due to the protection of the moving parts.

Advantageous embodiments of the invention are obtained according to the other features described herein.

BRIEF DESCRIPTION OF THE DRAWINGS

Further characteristics and advantages of the invention will be more apparent in the light of the detailed description of some preferred but nonexclusive embodiments of a liquid diffuser device for irrigation systems, shown by way of non-limiting example with reference to the drawings below, wherein.

DETAILED DESCRIPTION OF EMBODIMENTS OF THE INVENTION

Figure 1:
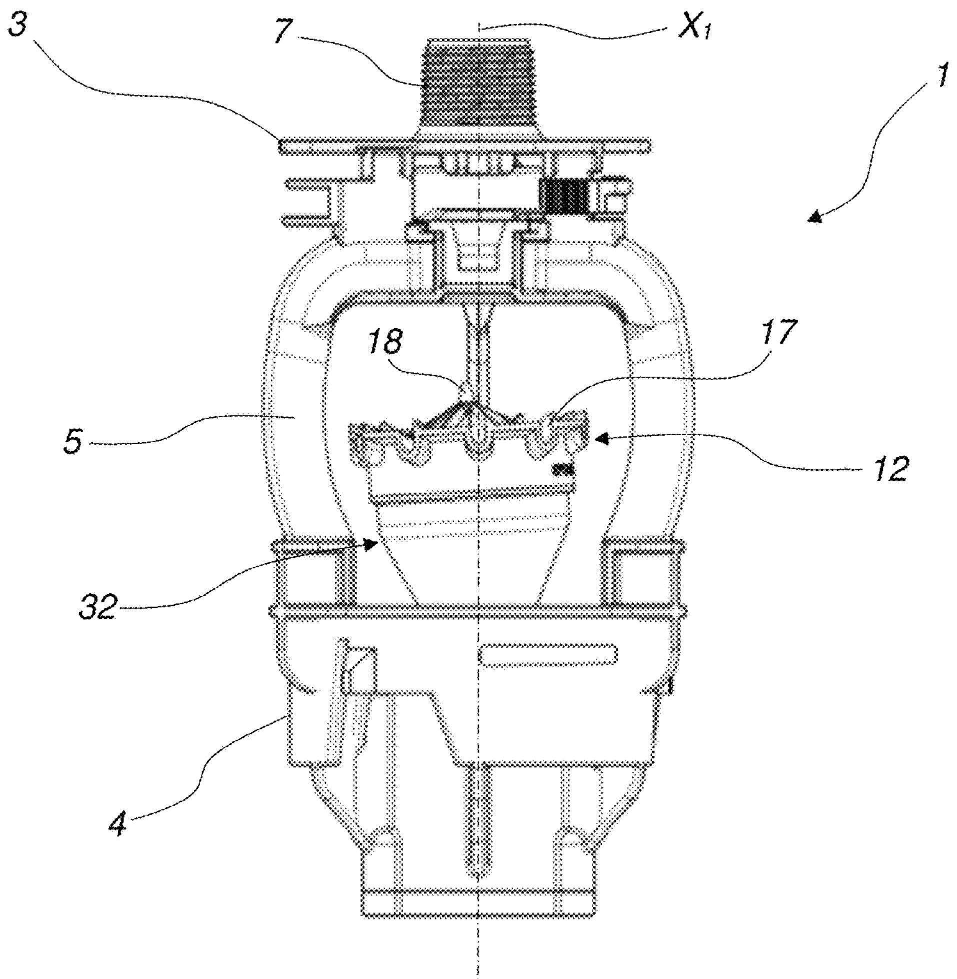
FIG. 1 is a lateral view of liquid diffuser according to the invention.

With reference to the mentioned figures, there is shown a liquid diffuser device according to the invention, generally indicated with reference numeral 1, intended to be used to distribute an irrigation liquid, typically water, on a land to be irrigated.

The diffuser device 1 may be suitably constrained to a distribution system fluidically connected with a line for supplying the irrigation liquid through a flow line of the per se known type, not shown in the figures.

As shown in the figures, the diffuser device 1 comprises a frame 2 defining a central rotation axis X1 and having an upper body 3 and a lower body 4 joined to each other by means of connection ribs 5.

The upper body 3 is provided with a fixed or removable nozzle 6, of the type described and claimed for example in EP2773465 to the present applicant, adapted to generate a liquid jet, preferably directed along the central axis X1 and not shown in the figures.

Hereinafter, it shall be assumed that the liquid jet is directed downwards; however, it cannot be ruled out that, with simple modifications, the nozzle 6 may be oriented so as to direct the jet upwards, in which case the definitions of upper body and lower body will be inverted.

The upper body 3 may be placed in fluid communication with a line for supplying the irrigation liquid through a threaded terminal element 7 for conveying the liquid towards the nozzle 6.

The lower body 4 is provided with an approximately toroidal-shaped stabilizing mass 8 or ballast housed in an appropriate seat 9, in order to maintain the device 1 in a substantially vertical position should the upper body 3 be arranged at the top.

Figure 3:
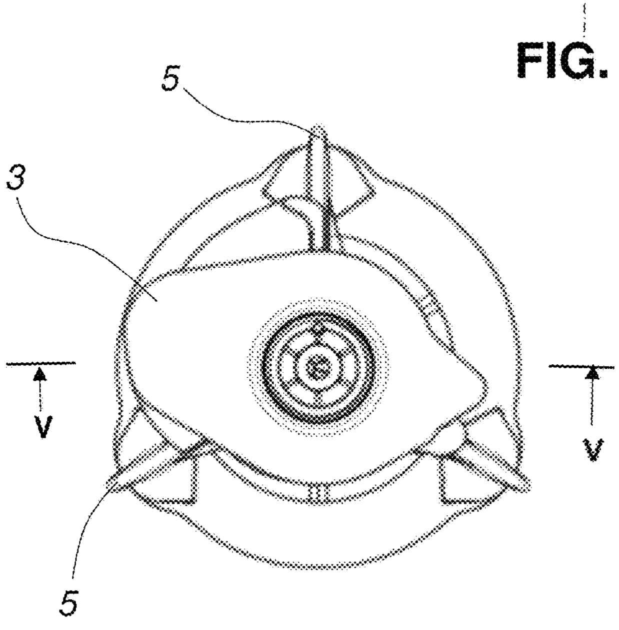
FIG. 3 is a top view of the liquid diffuser of FIGS. 1 and 2.
Figure 4:
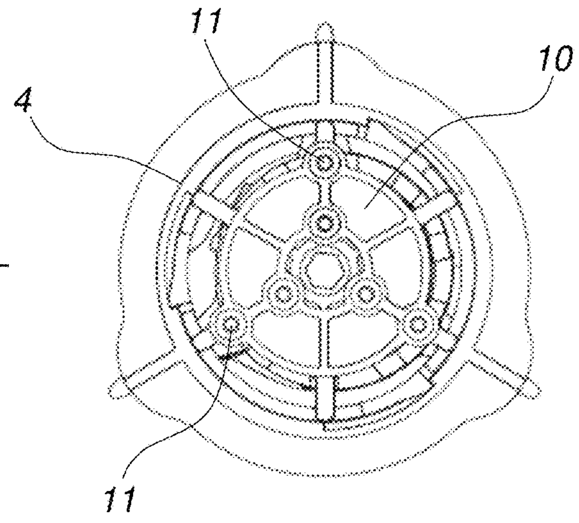
FIG. 4 is a bottom view of the liquid diffuser of FIGS. 1 and 2.
Figure 2:
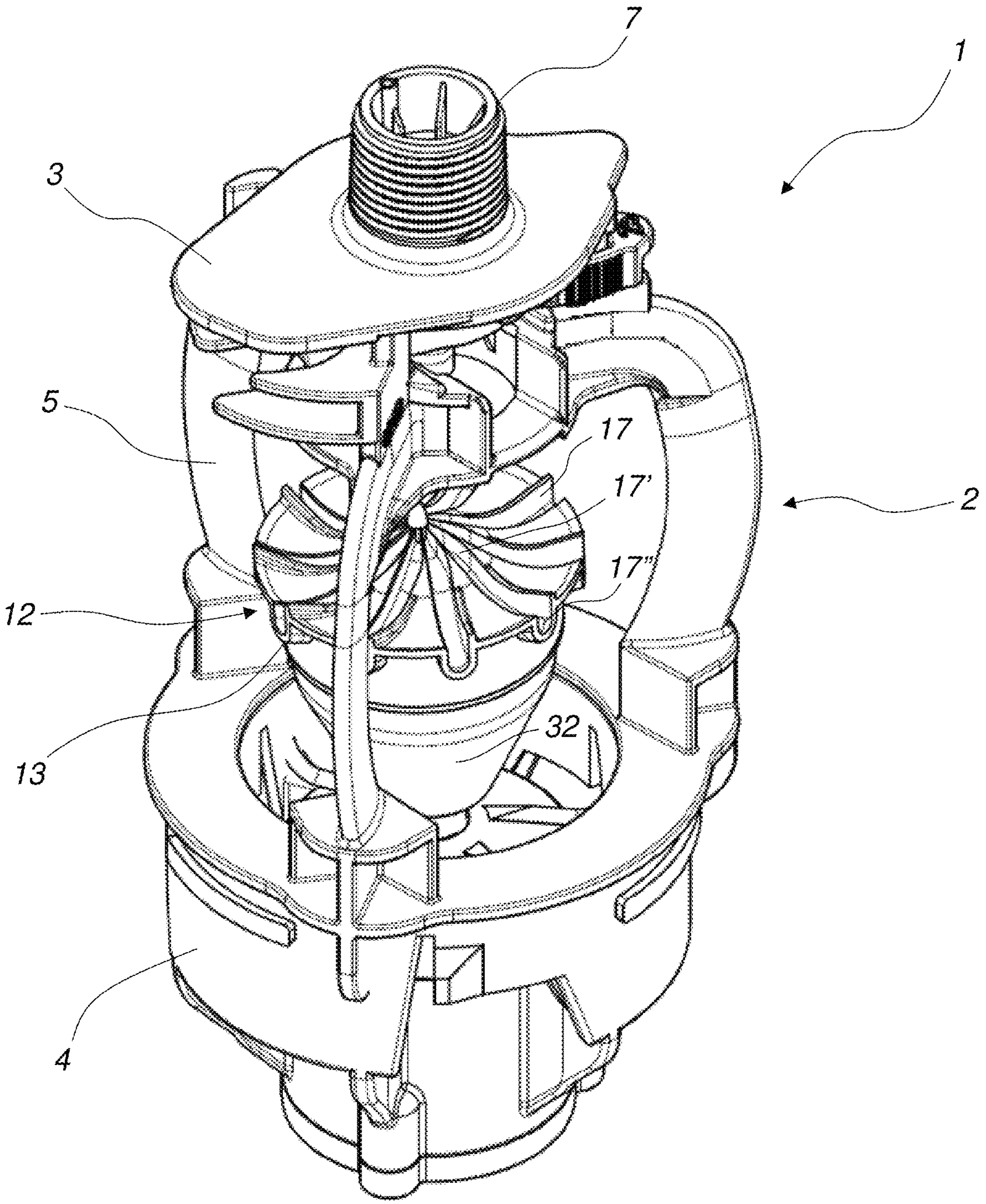
FIG. 2 is a top perspective view of the liquid diffuser of FIG. 1.
Figure 5:
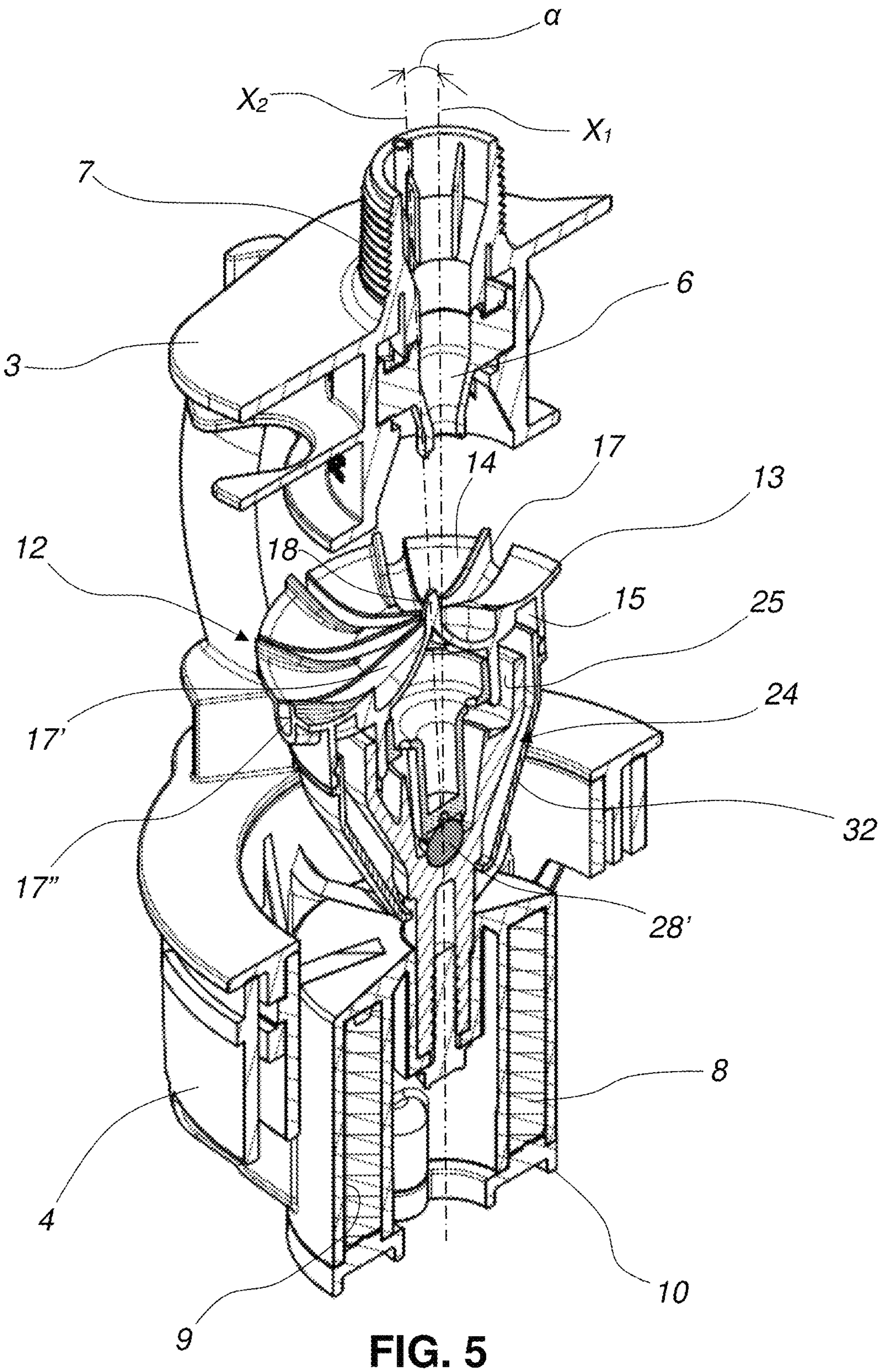
FIG. 5 is a partially cross-sectional view of the liquid diffuser of FIGS. 1, 2, 3.
Figure 6:
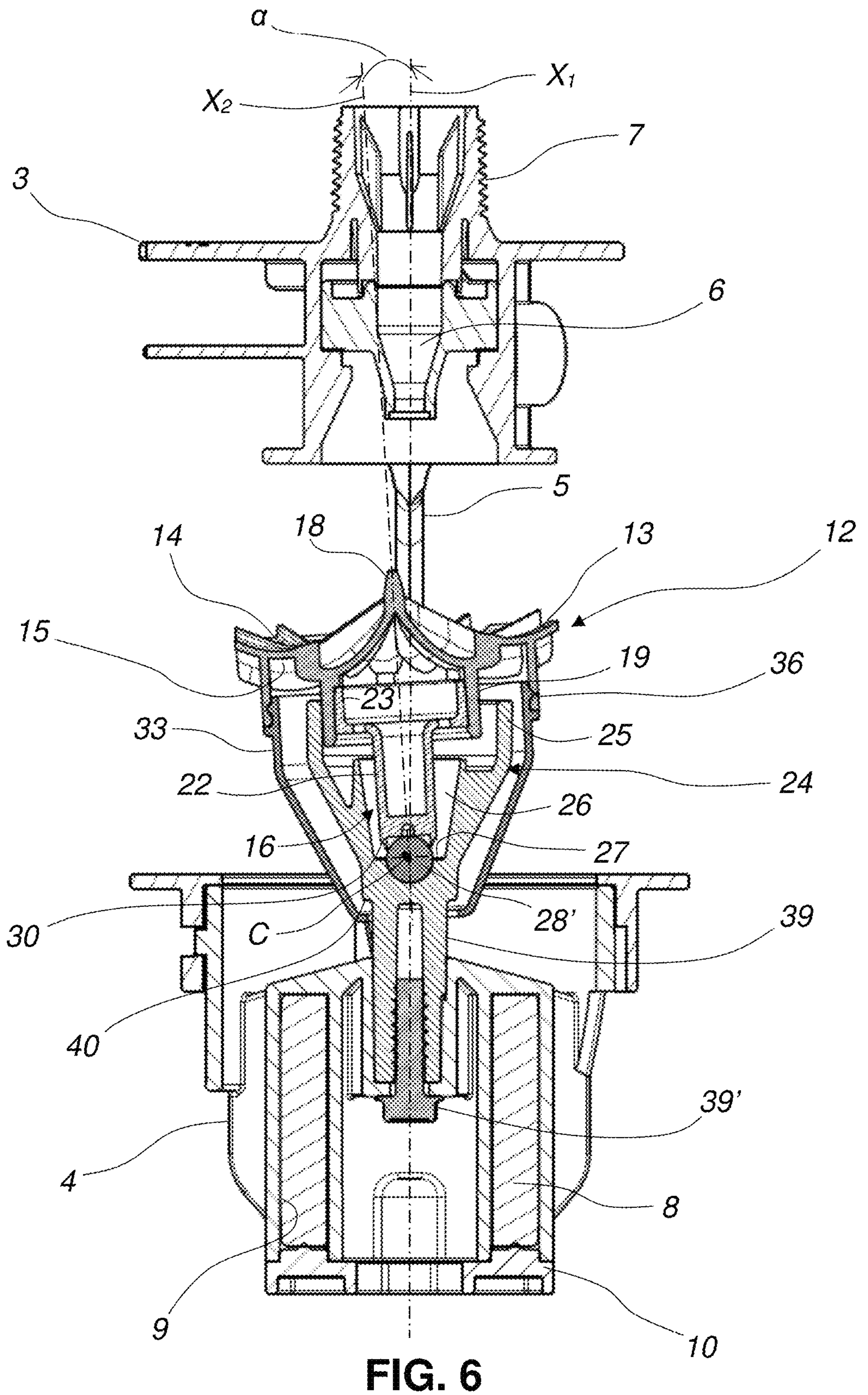
FIG. 6 is a view of the liquid diffuser of FIG. 3 sectioned according to the plane of line V-V.
Figure 7:
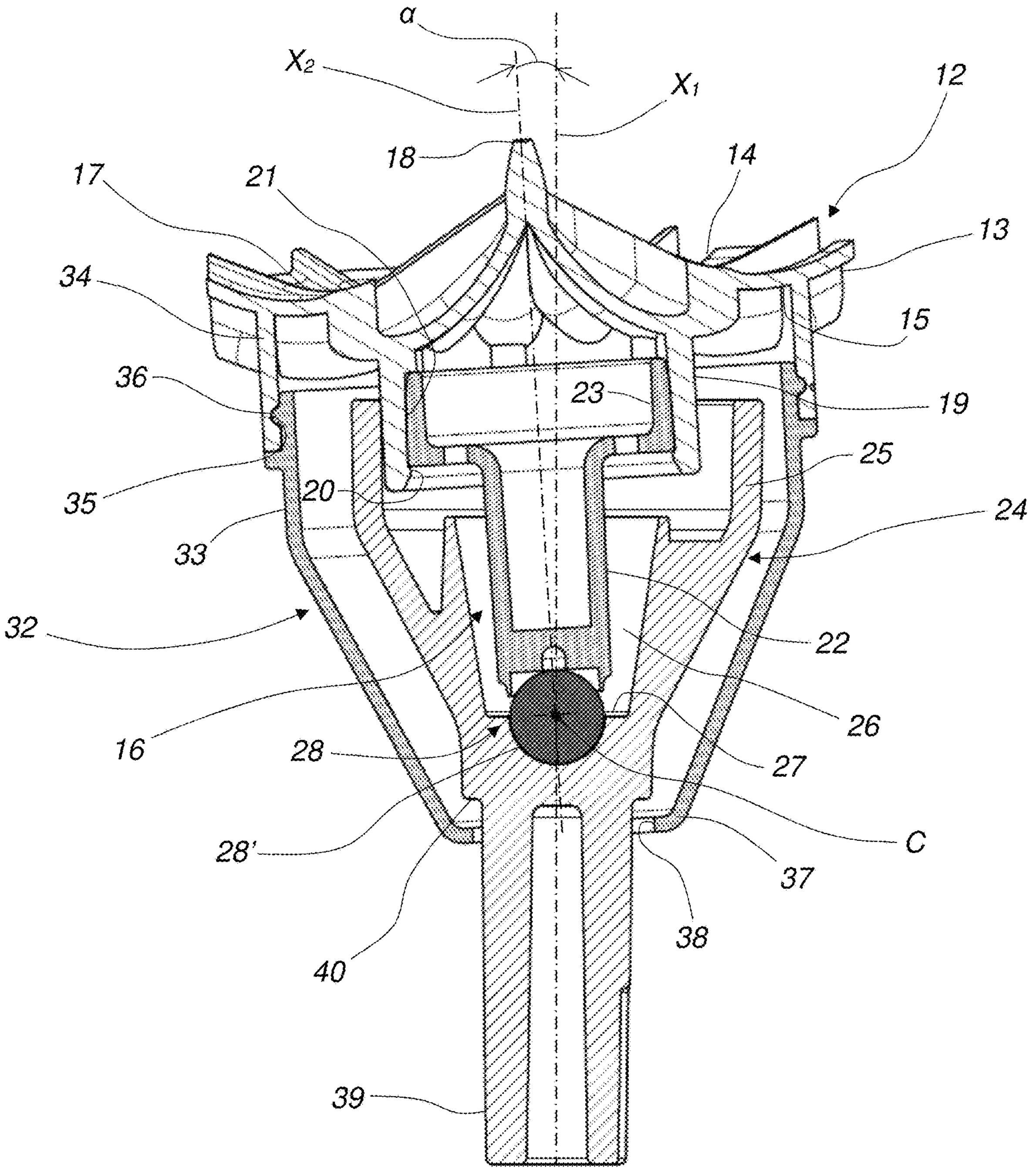
FIG. 7 is a cross-sectional view of a detail of FIG. 6.
Figure 8:
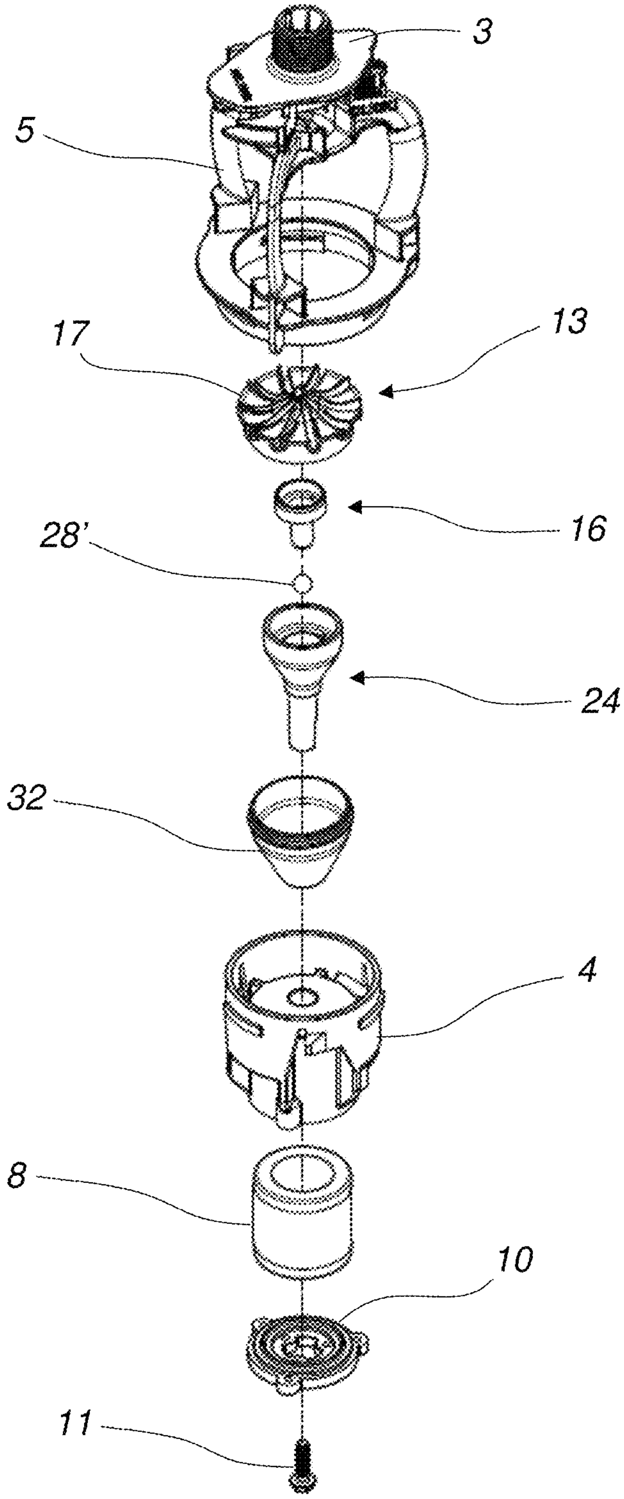
FIG. 8 is an exploded view of the diffuser device of the preceding figures.

In an embodiment, the stabilizing mass 8 may be locked in its seat 9 by means of a lid 10 locked with several screws 11 or with snap-coupling locking means, as shown in FIG. 3.

To distribute the irrigation liquid, there is provided an approximately mushroom-shaped deflector assembly, generally indicated with reference numeral 12, and having a secondary rotation axis X2 which intersects the central rotation axis X1 forming a nutation angle $\alpha$ with the latter. The deflector assembly 12 comprises a deflector head or plate 13 having a transversal upper face 14, facing the nozzle 6 and a lower face 15 opposite to the nozzle 6 on which a shaft or shank 16 is fitted.

In an embodiment, the upper face 14 of the deflector plate 13 is provided with several channels 17 all of which start from an axial protrusion 18, are angularly equidistant and directed outwards.

In a per se known manner, the channels 17 may have a double curvature-like configuration like the blades of a radial-axial turbine, with an inlet portion 17' inclined with respect to the symmetry axis X2 and an orthogonal outlet portion 17" with respect to the axis X2 and slightly inclined with respect to a radius, so as to impart a rotational torque around the aforementioned axis to the deflector plate 13.

On the face opposite to the channels 17, the deflector plate 13 has a first substantially cylindrical and annular formation 19, coaxial to the axis X2 and having an annular end edge 20 slightly protruding inwards so as to define a cylindrical connection seat 21 with the shank 16.

More precisely, shank 16 has a tubular lower portion 22 connected to an enlarged upper portion 23 adapted to be snap-coupled with the annular end edge 20 of the first formation 19 so as to be stably retained in the seat 21.

In order to support the deflector assembly 12 during the rotation thereof and provides for the guided nutation movement thereof, there is provided a hollow containment member 24 having a substantially cup-like shape with a larger section facing toward the nozzle 4.

At the upper part, the containment member 24 has an annular edge 25 with a substantially internal cylindrical surface defining a rolling surface for the first cylindrical formation 23, a substantially frustoconical internal cavity 26 having a bottom wall 27 and an axial lower stem 39 which will be described in greater detail hereinafter. In the bottom wall 27 there is positioned a rotary bearing 28 which, in an embodiment, consists of a single spherical member 28' with the rotation center C aligned with the central axis X1. The spherical member 28' is housed in a seat 29 of complementary shape although other technically equivalent embodiments cannot be ruled out.

In the case of a single spherical member 28', the seat 29 with complementary shape may have a diameter slightly larger than that of the spherical member 28' so as to enable the spherical member 28' to rotate freely and therefore reduce friction and wear of the surfaces in mutual contact.

In an embodiment, the vacant end 30 of the tubular portion 22 of the shank 16 has a recess 31 shaped to limit the contact surface with the spherical member 28' to the minimum and reduce sliding friction to the minimum.

Therefore, during the rotation motion of the deflector assembly 12, the outer surface of the first formation 19 of the deflector plate 13 it may rest and roll on the inner surface of the annular edge 25 of the containment member 24, imparting to the deflector assembly an orbital or nutation motion, around the nutation axis X2 with an angle α with respect to the central axis X1.

A peculiar characteristic of the invention lies in the fact that it provides a protection member 32 connected to the lower face 15 of the deflector plate 13 in order to move integrally joined with the latter.

Suitably, the protection member 32 has a partially frustoconical shape, larger than the containment member 24 and with a substantially cylindrical upper edge 33.

In an embodiment, the protection member 32 is configured to occlude the space between the lower face 15 of the deflector plate 13 and the annular edge 25 of the containment member 24 and protect the containment member 24 and the shank 16 and the spherical member 28' against the entry of liquid, dirt and debris so as to effectively ensure the orbital movement of the deflector assembly 12 as a whole.

In an embodiment, from the lower face of the deflector plate 13 there extends a second cylindrical formation 34 radially staggered outwards with respect to the first 19 and having an annular recess 35.

The coupling between the protection member 32 and the deflector plate 13 is carried out by means of an annular edge 36 protruding outwards present on the upper edge 33 of the protection member 32, which can be snap-coupled into the annular recess 35 of the second cylindrical formation 33 of the deflector plate 13. In this manner, the deflector assembly 12 and the protection member 32 are stably coupled forming a unitary body designed to rotate around the nutation axis X2 and at the same time around the central axis X1.

In an embodiment, the frustoconical wall of the protection member 32 has, at the narrow lower section thereof, an end edge 37 radially inwardly directed with a circular opening 38 having an inner diameter larger than the outer diameter of the stem 39 dimensioned so as not to interfere with the precession movement of the deflector assembly 13.

In an embodiment, the stem 39 has a lower end which can be coupled to the lower body 4 by means of a screw 39' or any alternative connection means, such as a pin with snap-engagement.

Suitably, the axial stem 39 may have on the substantially cylindrical outer surface thereof an annular step 40 defining an axial abutment surface for the end edge 37 radially inwardly directed with respect to the protection member 32, so as to prevent the separation of the protection member 32 with respect to the containment member 24 as well as from the lower body 4 after the mutual coupling thereof.

Due to this configuration, the protection member 32 serves not only to occlude the space between the lower face 15 of the deflector plate 13 and the annular edge 25 of the containment member 24, but also and above all to protect the containment member 24 up to the stem 39 and all moving parts of the deflector assembly 12, including the shank 16 and the spherical member 28 against the entry of liquid, dirt and debris, so as to ensure the orbital movement of the aforementioned assembly during the operation thereof.

In an embodiment, the containment member 24 and the stem 16 of the deflector assembly 12 are made of polymeric material reinforced with carbon fibers, so as to increase the lightness and the resistance of the two components to stress and wear.

Furthermore, all components of the device are preferably made of polymeric materials provided with relative elasticity to facilitate mutual assembly or disassembly, through snap-coupling or de-coupling, for cleaning and maintenance. The spherical member 28' is preferably made of ceramic material, although other materials with high hardness and resistance to wear cannot be ruled out.

In use, the irrigation liquid, for example water, will be conveyed towards the nozzle 6 so as to generate a jet directed towards the deflector plate 13, the water will flow through the channels 17 from which it will be directed outwards providing a uniform irrigation. At the same time, the final portions 17" of the channels 17, slightly inclined with respect to a radius, will impart a rotation around the axis X2 to the deflector plate 13 and a nutation movement around the central axis X1 to the deflector assembly 12.

Due to the presence of the protection member 32, water—even if containing dirt and debris—will not enter into the interspace between the lower face of the deflector plate 13 and the annular edge of the containment member 24, protecting the shank 16 of the deflector assembly 12 and the spherical member 28 of the containment member 24 from the infiltration of liquids, solids and debris, therefore ensuring the continuous nutation motion of the deflector assembly 12.

In the light of the above it is clear that the liquid diffuser device according to the invention achieves the pre-established objects and in particular it increases the reliability thereof, it allows an optimal protection of moving parts by ensuring its operation even if it is supplied with dirty water or water containing mud and debris.

The device according to the invention is susceptible to numerous modifications and variants all falling within the inventive concept outlined in the attached claims. All details can be replaced by other technically equivalent elements, and the materials can be different depending on the technical needs, without departing from the scope of protection of the invention. The term "substantially" indicated a deviation up to ±20% from nominal.

Although the device has been described with particular reference to the attached figures, the reference numerals are meant for improving the intelligibility of the invention and do not limit the claimed scope of protection in any manner whatsoever.

INDUSTRIAL APPLICABILITY

The present invention can be applied at industrial level because it can be manufactured on industrial scale by industries belonging to the industry of liquid diffuser devices for irrigating farming land.

The invention claimed is:

1. A liquid diffuser device for irrigation systems, comprising:

a frame defining a central axis and having an upper body provided with a nozzle connected to a line for supplying an irrigation liquid to generate a substantially axial jet, and a lower body provided with a stabilizing mass;

a deflector assembly having a deflector plate with an upper face facing said nozzle and a lower face, from which a shank extends from a side opposite to said nozzle; and a containment member operatively associated with said lower body and having a peripheral annular collar, a stem, and a cavity with a bottom wall, on which there is arranged a rotatable support, wherein said deflector assembly is inserted into the cavity of said containment member with an end of said shank resting against said rotatable support and with said lower face of said deflector plate spaced apart from said annular collar to allow a free rotation of said deflector assembly, further comprising a protection member joined to said deflector plate and configured to occlude a space between a lower face of said deflector plate and said annular collar of said containment member, and to enclose said containment member and said rotatable support to prevent an entry of foreign liquids, solids and debris and ensure a nutation motion of said deflector assembly;

wherein said lower face of said deflector plate has a first annular formation configured to define a connection element with an enlarged portion of said shank wherein said lower face of said deflector plate has a second substantially cylindrical annular formation radially offset with respect to the first annular formation, said protection member having a substantially frustoconical shape with a substantially cylindrical upper edge for coupling by snap-coupling means to said second annular formation of said deflector plate.

2. The liquid diffuser device as claimed in claim 1, wherein the upper face of said deflector plate is configured to deflect the substantially axial jet generated by said nozzle and direct the substantially axial jet in an outwardly transverse direction to evenly distribute the irrigation liquid and promote rotation of the deflector assembly.

3. The liquid diffuser device as claimed in claim 1, wherein said containment member is cup-shaped and has a substantially frustoconical upper portion with the peripheral annular collar having an internal surface that is substantially cylindrical and that defines a rolling surface for an outer cylindrical surface of said first annular formation of said deflector plate.

4. The liquid diffuser device as claimed in claim 1, wherein said protection member has, at a lower section thereof of lower thickness, an end edge radially inwardly directed with a circular through opening.

5. The liquid diffuser device as claimed in claim 4, wherein said containment member has, starting from said bottom wall, an axial stem adapted to be coupled at a lower end thereof to said lower body with a universal connection system.

6. The liquid diffuser device as claimed in claim 5, wherein said axial stem of said containment member has an outer diameter smaller than an outer diameter of said circular through opening, and further has, on an outer surface thereof, an annular step defining an abutment surface for said end edge radially inwardly directed with respect to said protection member to prevent a separation of said deflector assembly from said containment member and from said lower body of said frame.

7. The liquid diffuser device according to claim 6, wherein said containment member and said axial stem are unitary and made of a polymeric material reinforced with carbon fibers.

8. The liquid diffuser device as claimed in claim 1, wherein said rotatable support comprises a spherical member housed in a seat of complementary shape formed in said bottom wall of said containment member.

9. The liquid diffuser according to claim 8, wherein said spherical member is made from a ceramic material.

10. The liquid diffuser device as claimed in claim 8, wherein said seat is sized to allow a free rotation of said spherical member and reduce friction between said spherical member and said end of said shank.

11. The liquid diffuser device as claimed in claim 8, wherein said shank has, at a free end thereof, a recess shaped to rest on said spherical member.

12. The liquid diffuser device as claimed in claim 1, wherein said stabilizing mass is substantially toroidal and is housed in a complementarily shaped cavity formed in said lower body of said frame.

13. The liquid diffuser device as claimed in claim 11, wherein said stabilizing mass is stably joined to a lower area of said lower body by overmolding.

14. The liquid diffuser device as claimed in claim 11, wherein said stabilizing mass is removably joined to said lower body and is locked in a corresponding seat using a lid.

15. The liquid diffuser device as claimed in claim 1, wherein said nozzle is removable and is replaceable with another nozzle having a different inner diameter.

* * * * *